United States Patent [19]

Muller

[11] 4,423,807
[45] Jan. 3, 1984

[54] PROCESS AND APPARATUS FOR THE FORMATION OF SETTING LAYERS MADE UP OF BRICK BLANKS

[75] Inventor: Walter Muller, Krumbach, Fed. Rep. of Germany

[73] Assignee: Lingl Corporation, Paris, Tenn.

[21] Appl. No.: 256,248

[22] Filed: Apr. 21, 1981

[30] Foreign Application Priority Data

Feb. 23, 1980 [DE] Fed. Rep. of Germany ....... 3006909

[51] Int. Cl.³ ............................................. B65G 47/26
[52] U.S. Cl. ..................................... 198/425; 198/459
[58] Field of Search ................... 198/425, 459; 414/60

[56] References Cited

U.S. PATENT DOCUMENTS 3,625,375 12/1971 Lingl .
3,887,060 6/1975 Kamphues .
4,312,440 1/1982 Brugger .
4,336,874 6/1982 Kamphues ........................ 414/60 X

FOREIGN PATENT DOCUMENTS 656732 1/1965 Belgium ............................. 198/425
2505282 8/1976 Fed. Rep. of Germany ...... 198/459

Primary Examiner—Jeffrey V. Nase
Attorney, Agent, or Firm—Cushman, Darby & Cushman

[57] ABSTRACT

Apparatus and process for forming setting layers comprised of separated cross rows of brick blanks. Closed row layers of brick blanks are fed to a stop point where they are lifted above a conveyor provided to move the blanks from a start point to a tapping position. When the closed rows are lifted a portion at the lead end are isolated on a plurality of lifting elements so that this portion can be redeposited sequentially by cross row or by groups of cross rows to form the separated setting layer.

17 Claims, 5 Drawing Figures

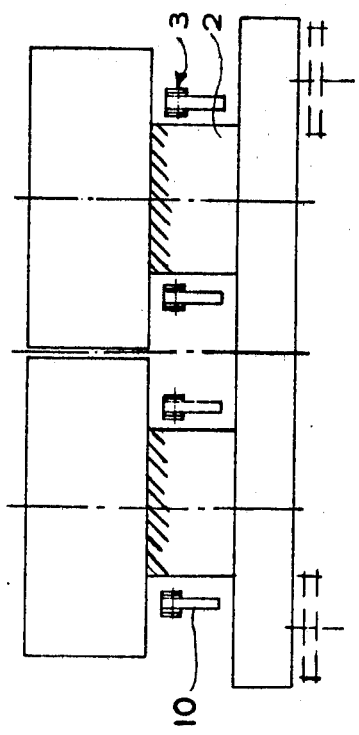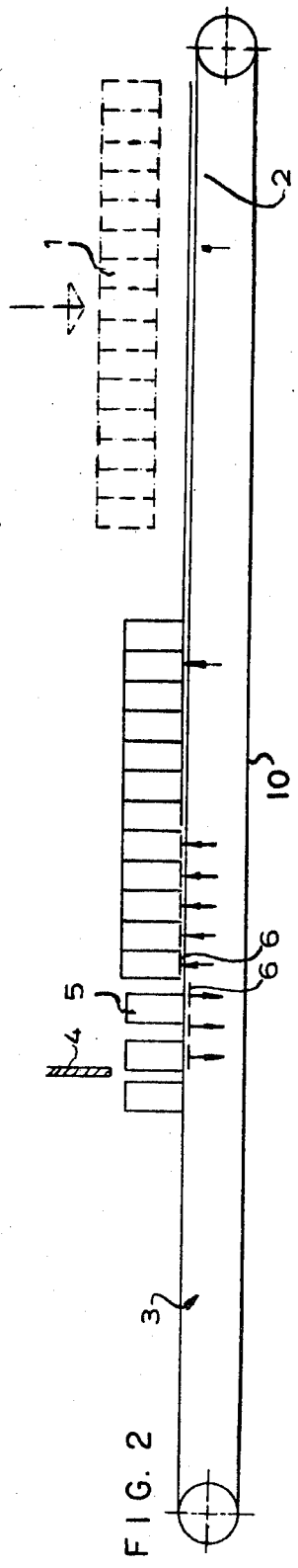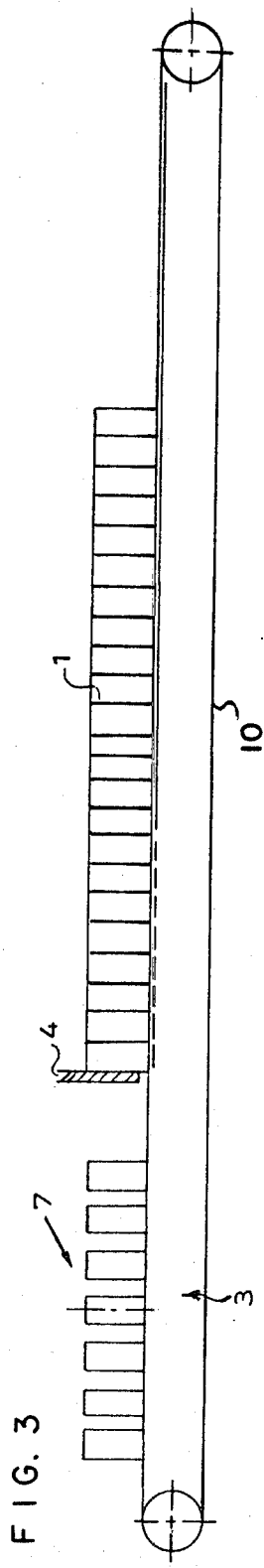
FIG. 1
FIG. 2
FIG. 3

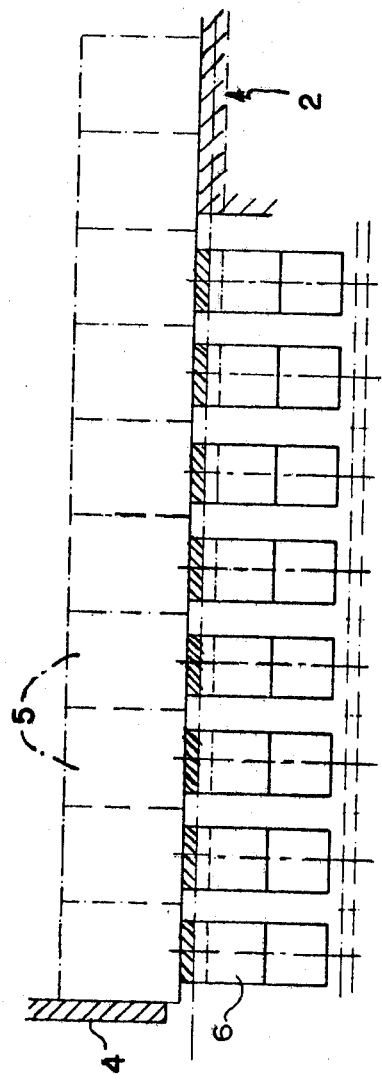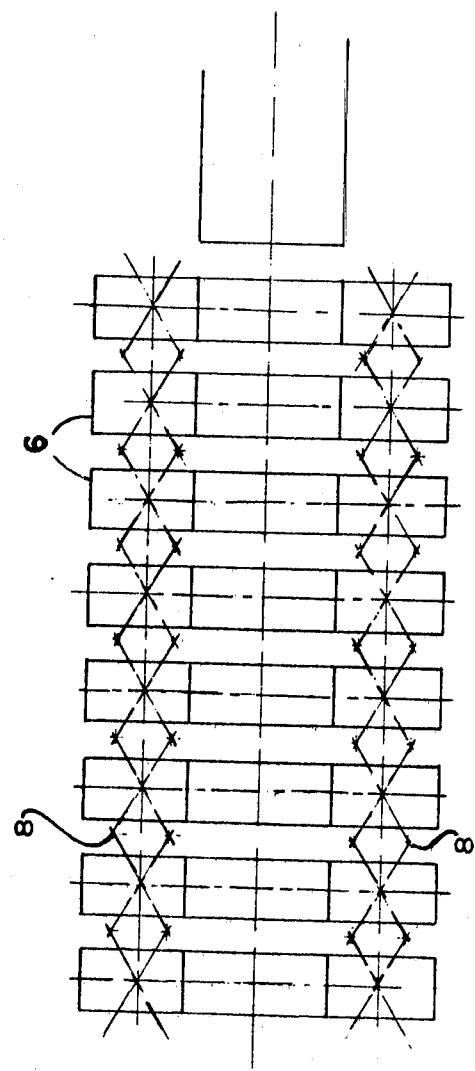

PROCESS AND APPARATUS FOR THE FORMATION OF SETTING LAYERS MADE UP OF BRICK BLANKS

BACKGROUND OF THE PRESENT INVENTION

The invention relates to a process for forming setting layers from brick blanks, the cross rows of which have predetermined mutual spacings. The process establishes such desired spacings by isolating the blanks which start out in longitudinal starting rows where the blanks are disposed closely to one another. The layer comprised of these closed rows is directed against a stop strip, and the closed longitudinal rows of blanks are lifted off the conveying apparatus after which the front portion of the lifting mechanism, comprised of a plurality of lifting elements, redeposits cross rows, individually or in groups, so that the cross rows are separated at certain mutual spacings. The invention also relates to apparatus for carrying out the process.

Brick blanks are placed on a platform or transport wagon, for further processing, for example, in a kiln in such a way, that a desirable stack can be developed by the cross-wise stacking of setting layers. This is favorable from a point of view of both firing as well as transportation techniques. The mutual spacings of the cross rows in the layers must, therefore, be freely adjustable.

German Pat. No. 1 281 637 (U.S. Pat. No. 3,625,375) discloses a process in which the stacking goods are deposited in several adjacent, longitudinal rows at a stacked width on a feed belt or are pushed onto it, which begins to move and conveys in longitudinal rows against a stop strip, so that they are aligned. After stopping the feed belt the stop strip is lifted off and a "placing in readiness" belt following it, is started at the same speed, so that the aligned cross rows of the stacked goods are successively transferred to the "placing in readiness" belt. However, the feed belt is stopped at such intervals and again switched on in a programmed manner, that a stacked layer is formed on the "placing in readiness" belt, in which the individual cross rows come to lie at possibly variable spacings, required for the setting of the stacks.

From German Pat. No. 2 312 946 (U.S. Pat. No. 3,887,060) it is known to line longitudinal rows in such a way, that the blanks pushed together in longitudinal and cross rows into a starting setting layer are easily lifted off from a support, developed as a roller table, by a carrier element, developed as a rake, and reaching through the roller table, and are moved in the direction of the longitudinal rows, until the foremost cross row in the direction of movement encounters a resistance, by which at least the hindmost lifted cross row of blanks is again pushed onto the support, whereupon the remaining lifted cross rows are moved on in case of a counterbalanced resistance until they achieve a desired cross row spacing. By the renewed action of the correspondingly adjusted resistance at least one more cross row is again pushed off onto the support, whereby, after such an intermittent, renewed pushing off of all cross rows the setting layer of blanks with the predetermined spacings between the individual cross rows, results.

From German Pat. No. 2 831 485 (U.S. Pat. No. 4,312,440) it is known, to lift of closed rows of blanks, put in readiness on a roller table, by means of at least one lifting table with strips. The strips move between the rollers of the roller table, to move the lifting table, which is disposed in a shifting frame, in a longitudinal direction of the rows of blanks, whereby the lifting table is lifted up and lowered in a controlled manner. Those blanks remaining on the lifting table are transferred intermittently by this action and at certain mutual spacings to the roller table for the formation of separated layers of blanks.

In the process of German Pat. No. 1 281 637 (U.S. Pat. No. 3,625,375), it is disadvantageous that the transfer from the feed belt to the "placing in readiness" belt takes place by way of a strip, which bridges the distance between terminal rollers of the belts, and which forms a resistance which must be overcome by the friction of the rows of blanks with the feed belt. Uneven friction as a result of a differing length of the rows of blanks, broken bits beneath the blanks as well as uneven wear of the strip and thus temporarily uneven contact of the blank to be transferred with the "placing in readiness" belt, cause a sloppy setting up of the layer of blanks, particularly in case of small sizes. Moreover, the periodic stopping and starting of the feed belt leads to a wobbling of the bricks to be transferred, which then for this reason too may no longer be lined precisely.

In case of the process according to German Pat. No. 2 312 946 (U.S. Pat. No. 3,887,060) it is disadvantageous that upon pushing off of the blanks from a rake onto the support, the difference in height between the rake and the support must be very great. Burrs or irregularities on the bricks would otherwise lead to driving by the support and thus to sloppy lining. The difference in height however causes particularly thinner formats to tip or wander over the end of the rake during stripping.

In the process disclosed in German Pat. No. 2 831 485 (U.S. Pat. No. 4,312,440) it is a disadvantage that the lifting and lowering of the aligning table is conditional on a decrease in output during the aligning process.

Therefore, the present invention is based on the task of making the separating of the blanks for the formation of setting layers independent of friction of the blanks with transportation means, of preventing the wobbling and tilting of the blanks by repeated starts during the aligning and of depositing the blanks in such a way on the "placing in readiness" machinery, that even their formats may be set up perfectly aligned.

Another task consists in creating a process which will do justice to the ever higher performance requirements.

SUMMARY OF THE INVENTION

The problems and difficulties of these known techniques are solved by the present invention, in that the conveying machinery moves continuously and conveys the blanks from a depositing point to a tapping point for the separated setting layer. After removal of the stop strip with all the cross-rows compacted and with a predetermined number now isolated and ready to be separated as desired, the cross rows, beginning with the first cross row, are redeposited successively onto the conveying machinery in a sequence controlled in dependence on the transportation path of the conveying device.

The task of the invention is solved through use of apparatus for carrying out the process together with conveying machinery which includes mechanism that can penetrate vertically through the belts of the conveying machinery onto which nonseparated rows of blanks may be deposited. The lifting mechanism extends up to a stop strip with the end of the lifting mechanism facing the stop strip being comprised of a number of individual lifting elements, the number of which corresponds at least to the largest possible number of cross rows of blanks in a setting layer.

The advantages achieved with the present invention are found especially in the fact that the cross rows of blanks for aligning are deposited on the conveying mechanism or the lifting apparatus, so that the transfer is always accomplished precisely, the formats may be transferred neatly and in case of aligning no dragging on the supports takes place. Moreover, high output may be achieved, since entire layers of closed rows of blanks may be put at the same time onto the feed, and the conveyance of the lined setting layer into the readiness position for tapping takes place simultaneously with the conveyance of the layer to be aligned against the stop strip. Accordingly, the conveying machinery remains continuously in operation and the blanks, with the exception of the lifted off state, keep moving steadily.

BRIEF DESCRIPTION OF THE DRAWINGS

Other objects, features, and characteristics of the present invention as well as the methods and operation and functions of the related elements of the structure, and to the combination of parts and economies of manufacture, will become more apparent upon consideration of the following description and the appended claims with reference to the accompanying drawings, all of which form a part of this specification, wherein like reference numerals designate corresponding parts in the various figures.

FIG. 1 diagrammatically shows a cross section through the apparatus with rows of blanks lifted off the conveying apparatus;

FIG. 2 shows diagrammatically a longitudinal section through the apparatus during separating and setting up of a new closed layer of blanks;

FIG. 3 shows a similar view as in FIG. 2 with the separated layer of blanks in tapping position downstream of the stop strip and with rows of blanks lined up closed against the stop strip, prior to lifting off;

FIG. 4 shows diagramatically at an enlarged scale a side view of the separating device with separated lifting elements for larger formats;

FIG. 5 is a top view of the device as in FIG. 4.

DETAILED DESCRIPTION OF THE PREFERRED EXEMPLARY EMBODIMENT

Turning now to the Figures, a layer of blanks, comprised of closed rows of blanks 1 as shown in FIG. 2, is deposited onto a lifting device 2, which reaches through a continuously running conveying apparatus 3, comprised of a plurality of spaced apart belts 10 for suitably supporting the blanks. After lowering of lifting device 2 the brick blanks are conveyed against a stop strip 4, so that the cross rows 5 of blanks are aligned as shown in FIG. 3.

As shown in FIGS. 2 and 4, the end of lifting device 2 facing stop strip 4 is comprised of a number of individual lifting elements 6, the number of which corresponds to the greatest possible number of cross rows of blanks 5 in one setting layer 7. After the closed cross rows of blanks 5 have been conveyed against stop strip 4 and have been aligned, the lifting device 2, inclusive of the lifting elements 6, is raised. After removal of stop strip 4, the lifting elements 6, beginning with those next to the stop strip 4, are lowered individually in a sequential fashion or by groups counter to the direction of conveyance of the conveying apparatus 3, whereby the lowering is program-controlled; in a conventional manner, in dependence on the transportation path of the conveying apparatus 3, so that cross rows of blanks 5 are separated at certain mutual spacings into a setting layer 7.

After completion of one setting layer 7, stop strip 4 is again lowered or otherwise placed in its stop position and lifting device 2 as well as lifting elements 6, which are still in a raised state, are lowered. While the separated setting layer 7 is conveyed in tapping position, the newly set-up closed rows 1 of blanks are conveyed against the blanks, that have remained on the lifting device 2, and against the stop strip 4 for alignment of the cross rows.

The lifting elements 6 are interconnected by scissors or lazy tong assemblies 8 as shown in FIG. 5, so that the spacing of lifting elements 6 in a longitudinal direction (direction of transportation) is adjustable and blanks of variable thickness may be supported centrally or in multiple fashion.

While the invention has been described in connection with what is presently considered to be the most practical and preferred embodiment, it is to be understood that the invention is not to be limited to the disclosed embodiment but on the contrary, is intended to cover various modifications and equivalent arrangements included within the spirit and scope is to be accorded the broadest interpretation so as to encompass all such modifications and equivalent structures.

What is claimed is:

1. A process for forming setting layers of brick blanks having cross-rows of brick blanks spaced apart at predetermined distances, said process comprising the steps of:
    continuously operating plural parallel spaced-apart conveyors to convey brick blanks along a longitudinal direction from a stacking point to a removal point,
    feeding a predetermined number of longitudinal rows of brick blanks onto the conveyors,
    stopping said rows at a predetermined point against a stop strip,
    isolating a predetermined portion of said stopped rows on plural lifting devices by raising the lifting devices between the parallel conveyors thereby lifting closed-up longitudinal rows off the conveyors, and
    redepositing said isolated portion on the continuously moving conveyors by sequentially lowering said lifting devices beginning with the first cross-machine row stopped adjacent the stop strip.

2. A process as in claim 1 wherein cross-machine rows of the isolated portion are redeposited individually and sequentially row-by-row.

3. A process as in claim 1 wherein cross-machine rows of the isolated portion are redeposited with at least some of the cross-machine rows being redeposited substantially adjacent to one another.

4. A process as in claim 1 wherein at least some groups of cross-machine rows in the isolated portion are redeposited onto the conveying machinery as a group.

5. A process as in claim 1 wherein the step of redepositing includes the additional step of removing the stop strip so that the rows being redeposited move therepast on the conveying machinery.

6. A process as in claim 5 including the further steps of:
    repositioning the stop strip to again stop brick blanks after said redeposited rows have moved therepast and, substantially simultaneously with moving the separated rows to said removal point, lowering the lifting devices to redeposit any remaining rows on the conveyors to allow them to move toward the stop strip while feeding additional brick blanks onto the conveyors upstream of the lifting devices and stopping the most downstream brick blanks against the stop strip.

7. A process as in claim 6 including the additional step of adjusting the spacing between the separated rows.

8. Apparatus for forming separated setting layers having spaced apart cross rows from closely positioned cross rows of brick blanks comprising; plural parallel conveyor means for continuously conveying in a longitudinal direction brick blanks resting thereon, lifting means for moving between said parallel conveying means to thus lift cross rows of brick blanks from said conveyor means and for subsequently redepositing the brick blanks on said conveyor means, said lifting means having a plurality of independently movable individual lifting elements individually supporting cross rows within the setting layer so that individual rows may be sequentially redeposited on said conveyor means to form the separated setting layer, and movable stop means for controllably stopping movement of the brick blanks on the conveyor means to form adjacent cross-rows above said lifting means when it is not lifted.

9. Apparatus as in claim 8 wherein said lifting means further includes means for adjusting the spaced relationship along the longitudinal conveying direction between individual lifting elements.

10. Apparatus as in claim 9 wherein said adjusting means includes lazy tong means for interconnecting the individual lifting elements in the direction of conveyance.

11. Brick setting apparatus for controllably separating bricks, said apparatus comprising:
a continuously operating conveyor mechanism having plural parallel conveying means for movement of bricks placed thereon in a longitudinal direction from a stacking point to a removal point;
a movable stop means located at a predetermined point between said stacking and removal points for engaging and stopping the movement of bricks therepast; and
plural individually controllable lift means disposed between said parallel conveying means at longitudinally spaced apart locations upstream of said stop means for controllably lifting bricks at such locations from said conveying means and for sequentially redepositing such lifted bricks onto the conveying means after the stop means is disengaged thereby spacing the bricks apart in the longitudinal direction of conveyance as they are conveyed further downstream toward said removal point.

12. Brick setting apparatus as in claim 11 wherein said conveyor means each comprise a continuous belt conveyor.

13. Brick setting apparatus as in claim 11 wherein said lift means comprise at least some individual lifting elements having a longitudinal lifting surface no greater than the expected longitudinal dimension of an individual brick to be lifted.

14. Brick setting apparatus as in claim 13 further comprising means for adjusting the longitudinal spacing between said individual lifting elements.

15. A process for controllably separating bricks, said process comprising:
continuously operating a conveyor mechanism for movement of bricks placed thereon in a longitudinal direction from an upstream stacking point to a downstream removal point,
depositing bricks onto said conveyor mechanism and moving them downstream,
stopping said bricks located upstream of a predetermined stop point from further movement on the moving conveyor mechanism by placing an obstruction in their path to provide at least one longitudinal row of adjacent bricks thereat,
lifting at least some of said stopped bricks from contact with said conveyor mechanism,
removing said obstruction from the longitudinal conveyance path; and
redepositing at least some of the lifted bricks onto said conveyor mechanism in a sequence directed opposite the direction of brick conveyance such that spaced apart bricks are formed downstream on the conveyor mechanism as the bricks are further conveyed toward said removal point.

16. A process as in claim 15 further comprising:
repeating said stopping step while also redepositing any still lifted bricks onto said conveyor mechanism and then repeating said lifting, removing and redepositing steps.

17. A process as in claim 15 wherein all of said depositing, stopping, lifting, removing and redepositing steps are simultaneously performed for plural parallel longitudinal rows of bricks spaced apart in a cross row direction to result in a layer of bricks spaced apart in both the longitudinal and cross row directions at said removal point.

* * * * *